(12) United States Patent
Bergeret

(10) Patent No.: US 12,163,557 B2
(45) Date of Patent: Dec. 10, 2024

(54) CONNECTING ROD ADJUSTABLE IN LENGTH COMPRISING AN ANTI-ROTATION SYSTEM COOPERATING WITH A CONNECTING ROD SYSTEM, AIRCRAFT COMPRISING AT LEAST ONE SUCH CONNECTING ROD

(71) Applicant: Airbus Operations SAS, Toulouse (FR)

(72) Inventor: Christian Bergeret, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/177,371

(22) Filed: Mar. 2, 2023

(65) Prior Publication Data

US 2023/0287928 A1 Sep. 14, 2023

(30) Foreign Application Priority Data

Mar. 9, 2022 (FR) ...................................... 2202049

(51) Int. Cl.
*F16C 7/06* (2006.01)

(52) U.S. Cl.
CPC ............ *F16C 7/06* (2013.01); *F16C 2226/76* (2013.01); *F16C 2326/43* (2013.01)

(58) Field of Classification Search
CPC .......... F16C 7/00; F16C 7/06; F16C 2226/76; F16C 2226/80; F16C 2326/43; F16G 11/12

See application file for complete search history.

(56) References Cited

U.S. PATENT DOCUMENTS

| | | | | | |
|---|---|---|---|---|---|
| 3,989,394 | A | * | 11/1976 | Ellis | B62D 7/20 285/902 |
| 4,232,978 | A | * | 11/1980 | Cohen | F16C 7/06 403/317 |
| 4,274,754 | A | * | 6/1981 | Cohen | F16C 7/06 403/14 |
| 5,026,254 | A | * | 6/1991 | Ford | F16C 7/06 416/61 |

(Continued)

FOREIGN PATENT DOCUMENTS

| | | |
|---|---|---|
| DE | 202004004407 U1 | 7/2004 |
| WO | 2012100794 A1 | 8/2012 |

OTHER PUBLICATIONS

French Search Report for French Patent Application No. 2202049 dated Oct. 14, 2022; priority document.

*Primary Examiner* — Adam D Rogers

(74) *Attorney, Agent, or Firm* — Greer, Burns & Crain, Ltd.

(57) ABSTRACT

A connecting rod with a body, first and second fastening heads provided at each end of the body and connected by first and second connection systems to first and second elements, the first fastening head comprising an extension which is screwed into a housing of the body to adjust the length of the connecting rod. The connecting rod includes an anti-rotation system with a key, positioned astride the first fastening head and the body, which has a first part cooperating with the body so as to be rotationally immobilized with respect to the body and also a second part cooperating with the first fastening head and the first connection system so as to be immobilized with respect to the first fastening head.

6 Claims, 3 Drawing Sheets

(56) References Cited

U.S. PATENT DOCUMENTS

| | | | |
|---|---|---|---|
| 8,156,648 B2* | 4/2012 | Audart-Noel | F16C 7/02 |
| | | | 29/888.09 |
| 8,371,767 B2 | 2/2013 | Uhl et al. | |
| 9,624,966 B1* | 4/2017 | Obleman | H01Q 3/04 |
| 2013/0319172 A1 | 12/2013 | Uhl | |
| 2021/0054863 A1 | 2/2021 | Sultan et al. | |
| 2021/0317855 A1* | 10/2021 | Funck | F16B 7/20 |
| 2023/0080669 A1* | 3/2023 | Chaumet | F16C 7/06 |
| | | | 74/586 |
| 2023/0184278 A1* | 6/2023 | Klembara | F16C 7/06 |
| | | | 74/522 |

\* cited by examiner

CONNECTING ROD ADJUSTABLE IN LENGTH COMPRISING AN ANTI-ROTATION SYSTEM COOPERATING WITH A CONNECTING ROD SYSTEM, AIRCRAFT COMPRISING AT LEAST ONE SUCH CONNECTING ROD

CROSS-REFERENCES TO RELATED APPLICATIONS

This application claims the benefit of French application number 2 202 049 filed on Mar. 9, 2022, the entire disclosure of which is incorporated herein by way of reference.

FIELD OF THE INVENTION

The present application relates to a length-adjustable connecting rod comprising an anti-rotation system cooperating with a connecting rod connection system and also to an aircraft comprising at least one such connecting rod.

BACKGROUND OF THE INVENTION

In a known manner, a connecting rod comprises:
an elongate body which has a longitudinal axis,
a first fastening head, positioned at a first end of the body, comprising a first through-hole for connecting the connecting rod to a first element, and
a second fastening head, positioned at a second end of the body, comprising a second through-hole for connecting the connecting rod to a second element.

On a functional level, a connecting rod makes it possible to connect two elements while maintaining a constant distance and ensuring the transmission of forces between the two connected elements.

For the remainder of the description, the length of the connecting rod corresponds to the centre distance, separating the axes of the first and second through-holes, measured at the longitudinal axis.

According to one embodiment of the prior art, to obtain a length-adjustable connecting rod, the first fastening head comprises a threaded rod configured to be screwed into a tapped housing opening out at the first end of the body. Thus, it is possible to modify the length of the connecting rod by screwing the threaded rod of the first fastening head into the tapped housing of the body to a greater or lesser degree.

The connecting rod comprises an anti-rotation system for rotationally immobilizing the first fastening head and the body with respect to one another in order to keep the adjusted length of the connecting rod unchanged. According to one embodiment, the anti-rotation system comprises a locknut screwed onto the threaded rod until coming into contact with the body.

This embodiment is not fully satisfactory, since the locknut can become unscrewed owing to vibrations and cause a loss of adjustment of the length of the connecting rod. Moreover, when the connecting rod has a large diameter, the locknut is relatively bulky and has a large mass leading to an increase in the on-board mass.

The present invention aims to overcome all or some of the disadvantages of the prior art.

SUMMARY OF THE INVENTION

To this end, the invention relates to a connecting rod, configured to connect first and second elements, comprising a body extending between first and second ends and having a longitudinal axis, first and second fastening heads provided at each end of the body and also a first connection system configured to connect the first fastening head to the first element. The body and the first fastening head are separate, the body comprising, at its first end, an outer surface, a transverse end face and also an at least partially tapped housing opening out at the transverse end face; the first fastening head comprising an at least partially threaded extension for screwing into the housing of the body. The connecting rod comprises an anti-rotation system for rotationally immobilizing the first fastening head with respect to the body.

According to the invention, the anti-rotation system comprises a key, positioned astride the first fastening head and the body, which has a first part cooperating with the body so as to be rotationally immobilized with respect to the body and also a second part cooperating with the first fastening head and the first connection system so as to be immobilized with respect to the first fastening head. In addition, the first connection system comprises a connection pin, and the first fastening head comprises at least one plate which has faces which are parallel to one another and also a through-hole housing the connection pin. The second part of the key is a blade, configured to be pressed against one of the faces of the plate, which comprises a through-orifice configured to be aligned with the through-hole in the plate and to house the connection pin. The key comprises a third part, connecting the first and second parts, dimensioned in such a way that the first and second parts are simultaneously in contact respectively with the outer surface of the body and the plate of the first fastening head. The first fastening head comprises a transverse face substantially perpendicular to the longitudinal axis and to which the plate is attached, the third part comprising a substantially plane face configured to be pressed against the transverse face of the first fastening head.

This configuration makes it possible to obtain a more secure connection between the anti-rotation system and the connecting rod, limiting the risks of losses of adjustment of the length of the connecting rod owing to vibratory phenomena. According to another advantage, the volume and the mass of the anti-rotation system are not closely tied to the diameter of the connecting rod, contrary to a locknut, thereby making it possible to limit the impact on the on-board mass.

According to another feature, the first part has a face configured to be oriented towards the outer surface of the body and pressed against the latter, the face of the first part and the outer surface of the body having shapes which cooperate with one another so as to rotationally immobilize the first part of the key with respect to the body.

According to another feature, the anti-rotation system comprises a plurality of first teeth positioned on a section of the outer surface of the body, oriented parallel to the longitudinal axis and distributed over the whole circumference of the outer surface of the body. In addition, the face of the first part of the key has second teeth configured to nest between the first teeth of the body.

According to another feature, the second teeth have shapes complementary to those of the first teeth.

According to another feature, the first teeth extend from the transverse end face.

According to another feature, at least the face of the first part has a radius of curvature substantially identical to that of the outer surface of the body.

The invention also relates to an aircraft comprising at least one connecting rod according to one of the preceding features.

BRIEF DESCRIPTION OF THE DRAWINGS

Other features and advantages will emerge from the description of the invention which follows, the description being given purely by way of example and with reference to the appended drawings, in which.

DETAILED DESCRIPTION OF THE PREFERRED EMBODIMENTS

Figure 1:
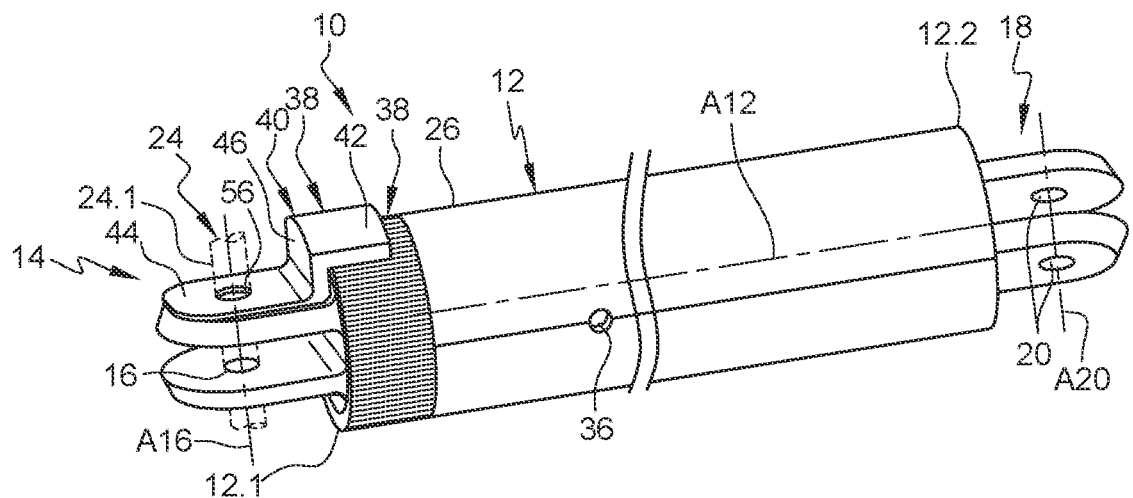
FIG. 1 is a perspective view of a connecting rod illustrating one embodiment of the invention.
Figure 2:
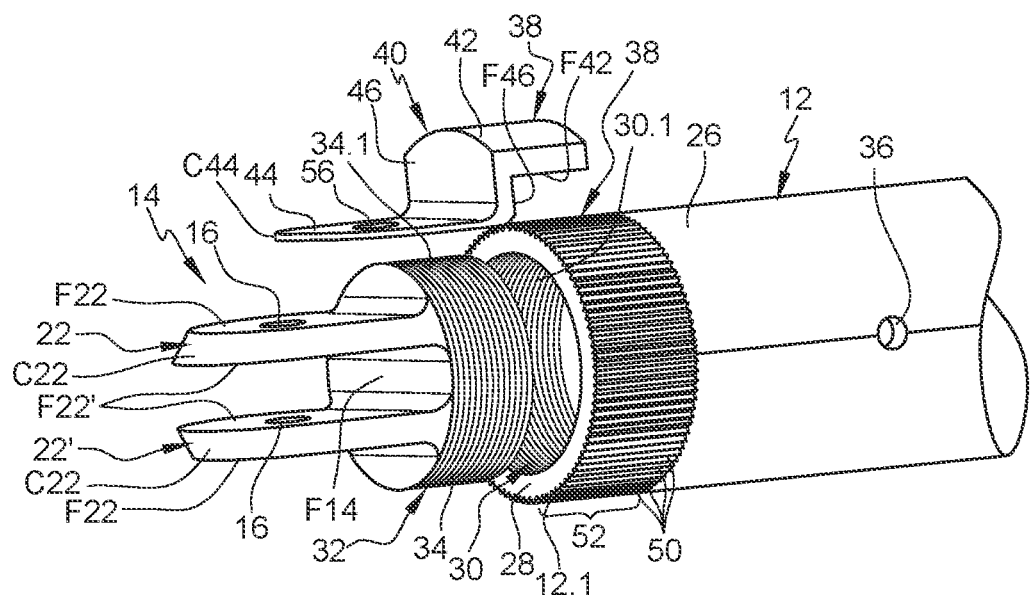
FIG. 2 is a perspective view from a first angle of view of a first end of the connecting rod visible in FIG. 1 in the demounted state.
Figure 3:
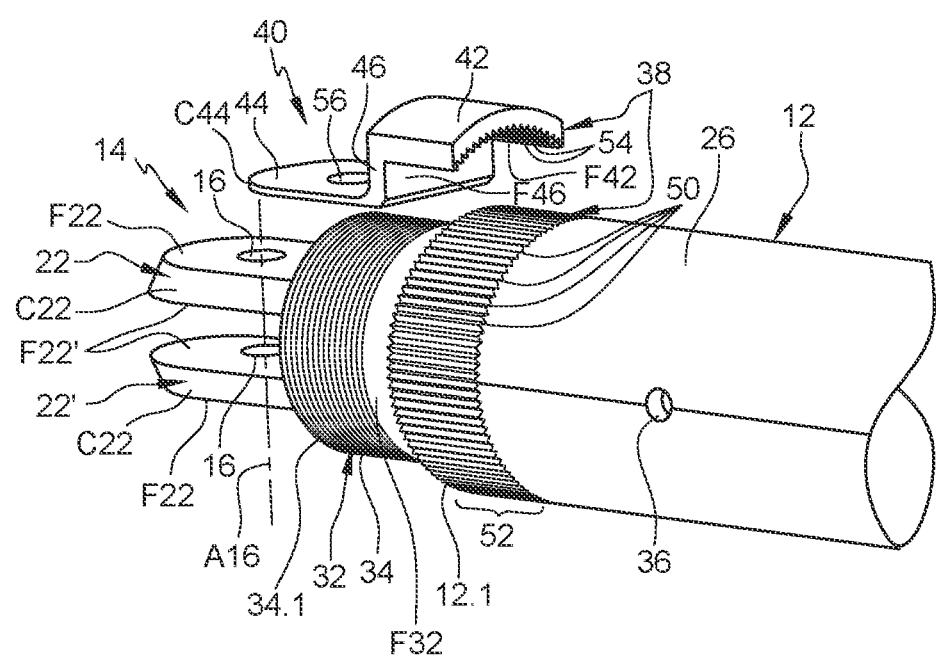
FIG. 3 is a perspective view from a second angle of view of the first end of the connecting rod visible in FIG. 1 in the demounted state.

According to one embodiment visible in FIGS. 1 and 2, a connecting rod 10 comprises:
- a body 12 which has a longitudinal axis A12 and extends between first and second ends 12.1, 12.2,
- a first fastening head 14, positioned at the first end 12.1 of the body 12, comprising a first through-hole 16 which has a first axis A16 intersecting the longitudinal axis A12, and
- a second fastening head 18, positioned at the second end 12.2 of the body 12, comprising a second through-hole 20 which has a second axis A20 intersecting the longitudinal axis A12.

According to one embodiment, the first fastening head 14 comprises at least one plate 22 which has faces F22, F22' which are parallel to one another and to the longitudinal axis A12, and also an edge C22. The first through-hole 16 opens out at the faces F22, F22' and the first axis A16 is substantially perpendicular to the faces F22, F22'.

According to one configuration illustrated by FIG. 1, the first fastening head 14 comprises two spaced and mutually parallel plates 22, 22', forming a clevis, each plate 22, 22' having a first face F22 oriented away from the other plate and also a second face F22' oriented towards the other plate. The two plates 22, 22' each comprise a through-hole 16, the through-holes 16 in the two plates 22, 22' being coaxial.

According to one configuration, the first fastening head 14 comprises a transverse face F14 substantially perpendicular to the longitudinal axis A12 and to which the plate(s) 22, 22' is (are) attached. The transverse face F14 is connected to the faces F22, F22' and to the edges C22 of the plates 22, 22' by fillets.

The second fastening head 18 can be identical to the first fastening head 14. Of course, the invention is not limited to this embodiment for the fastening heads 14, 18. In operation, the connecting rod 10 makes it possible to connect first and second elements while maintaining a constant distance and ensuring the transmission of forces between the first and second elements connected by the connecting rod 10.

Figure 4:
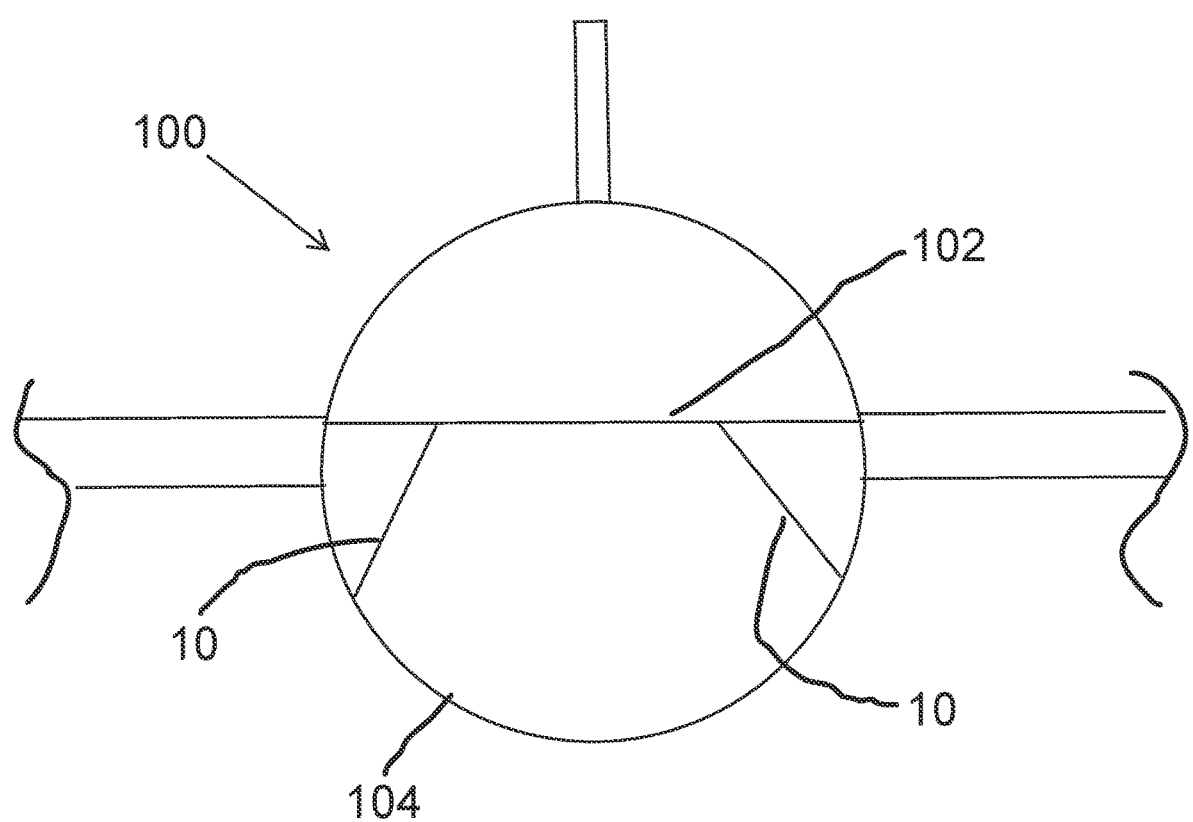
FIG. 4 is a front cross-sectional schematic view of an aircraft according to one or more embodiments of the present invention.

According to one application, as shown in FIG. 4, an aircraft 100 comprises at least one connecting rod 10 for connecting a floor 102 and a structure 104 of the aircraft 100. Of course, the invention is not limited to this application.

The connecting rod 10 comprises a first connection system 24 configured to connect the first fastening head 14 and the first element and also a second connection system configured to connect the second fastening head 18 and the second element.

According to one embodiment, the first connection system 24 comprises a connection pin 24.1 (shown in broken lines in FIG. 1) for connecting the first fastening head 14 to the first element. This connection pin 24.1 is housed in a through-hole 16 in each plate 22, 22' of the first fastening head 14. The connection pin 24.1 also comprises two stops at each of its ends for keeping it in position.

According to one configuration, at least one of the first and second through-holes 16, 20 can be equipped with a plane bearing, with a rolling bearing or with a sliding ring in order to obtain a pivot connection between one of the fastening heads of the connecting rod and a pin to which the connecting rod is connected.

When the first fastening head 14 comprises a single plate 22, the connection system 24 comprises a clevis which is secured to the first element to which the connecting rod 10 is connected and which is provided with two branches between which the plate 22 is positioned. When the first fastening head 14 comprises two plates 22, 22', the connection system 24 comprises a single branch which is secured to the first element to which the connecting rod 10 is connected and which is positioned between the two plates 22, 22'.

The second connection system can be identical to the first connection system 24.

According to one feature, the first fastening head 14 and the body 12 are two separate parts. The body 12 comprises, at its first end 12.1, an outer surface 26, which is substantially cylindrical and coaxial to the longitudinal axis A12, a transverse end face 28, which is substantially perpendicular to the longitudinal axis A12, and also a housing 30, which is substantially cylindrical, coaxial to the longitudinal axis A12 and to the outer surface 26 and which opens out at the transverse end face 28 and is configured to partially receive the first fastening head 14.

The housing 30 is at least partially tapped and has an internal thread 30.1. According to one configuration, the internal thread 30.1 extends from the transverse end face 28 over the whole length of the housing 30 or over all its length.

The housing 30 extends over at least part of the length of the body 12. According to one configuration, the housing 30 extends over the whole length of the body 12.

The first fastening head 14 comprises a cylindrical extension 32 which has a diameter substantially equal to that of the housing 30. This extension 32 has a lateral face 34 and extends between a transverse end face F32 and the transverse face F14. The extension 32 is at least partially threaded for screwing into the housing 30 of the body 12. Thus, the lateral face 34 of the extension 32 comprises a thread 34.1 configured to be screwed into the internal thread 30.1 of the housing 30 of the body 12.

Thus, it is possible to adjust the length of the connecting rod 10 by screwing or unscrewing the extension 32 of the first fastening head 14 in the housing 30 of the body 12.

According to one embodiment, the body 12 comprises at least one transverse orifice 36 used to pivot or rotationally immobilize the body 12 with the aid of a tool, such as a rod passing through the body 12 via the transverse orifice 36.

The connecting rod 10 comprises an anti-rotation system 38 for rotationally immobilizing the first fastening head 14 with respect to the body 12 in order to keep the length of the adjusted connecting rod 10 unchanged.

The anti-rotation system 38 comprises a key 40, positioned astride the first fastening head 14 and the body 12, which has a first part 42 configured to cooperate with the body 12 so as to be rotationally immobilized with respect to the body 12, a second part 44 configured to cooperate with the first fastening head 14 so as to be immobilized with respect to the first fastening head 14 and also a third part 46 connecting the first and second parts 42, 44.

The first, second and third parts 42, 44, 46 form one and the same part, the key 40.

The first, second and third parts 42, 44, 46 have the same width, which is substantially equal to the width of a plate 22 of the first fastening head 14. The width of the plate 22 corresponds to the dimension of one of the faces F22, F22' taken perpendicularly to the longitudinal axis A12.

Thus, the first part 42 extends over an angular sector of the circumference of the body 12, which is preferably less than one-third of the circumference of the body.

The first part 42 has a face F42 configured to be oriented towards the outer surface 26 of the body 12 and pressed against the latter in operation.

In order to optimize the area of the first part 42 in contact with the outer surface 26 of the body 12, at least the face F42 of the first part 42 has a radius of curvature substantially identical to that of the outer surface 26 of the body 12. According to one configuration, the first part 42 takes the form of a curved plate which has a radius of curvature substantially identical to that of the outer surface 26 of the body 12.

The face F42 of the first part 42 and the outer surface 26 of the body have shapes which cooperate with one another so as to rotationally immobilize the first part 42 of the key 40 with respect to the body 12.

For this purpose, the anti-rotation system 38 comprises a plurality of first teeth 50 positioned on a section 52 of the outer surface 26 of the body 12, oriented parallel to the longitudinal axis A12 and distributed over the whole circumference of the outer surface 26 of the body 12. These first teeth 50 extend from the transverse end face 28. According to one embodiment, the section 52 of the body 12 is splined to form the first teeth 50.

In addition, the face F42 of the first part 42 of the key 40 has second teeth 54 configured to nest between the first teeth 50 of the body 12. These second teeth 54 are parallel to one another and oriented in a direction parallel to the longitudinal axis A12 when the face F42 of the first part 42 of the key 40 cooperates with the outer surface 26 of the body 12. These second teeth 54 have shapes complementary to those of the first teeth 50.

The second part 44 takes the form of a blade configured to be pressed against one of the faces F22, F22' of a plate 22, 22' of the first fastening head 14. The second part 44 has an edge C44 substantially identical to that of the edge C22 of the plate 22, 22' against which it is pressed. When the first fastening head 14 comprises two plates 22, 22', the second part 44 can be pressed equally against one or other of the plates 22, 22'.

The second part 44 comprises a through-orifice 56 configured to be aligned with the through-hole 16 in the plate 22, 22' against which the second part 44 is pressed and to house the connection pin 24.1. This through-orifice 56 has a diameter substantially identical to that of the through-hole 16 and of the connection pin 24.1.

In operation, the connection pin 24.1 passes through each plate 22, 22' of the first fastening head 14 and through the second part 44 of the key 40. In addition, the second part 44 of the key 40 is positioned between the plate 22, 22' of the first fastening head 14 and one of the stops of the connection pin 24.1 or one of the branches of the clevis of the first element to which the first fastening head 14 is connected by the connection pin 24.1. Thus, the second part 44 of the key 40 is immobilized with respect to the first fastening head 14.

According to one arrangement, the third part 46 takes the form of a plate which is substantially perpendicular to the second part 44 and comprises a substantially plane face F46 configured to be pressed against the transverse face F14 of the first fastening head 14. This arrangement promotes the positioning of the key 40 with respect to the first fastening head 14 and/or to the body 12. This intermediate part 46 is dimensioned in such a way that the first and second parts 42, 44 are simultaneously in contact respectively with the outer surface 26 of the body 12 and one of the plates 22, 22' of the first fastening head 14.

Of course, the invention is not limited to the above-described embodiment. Thus, the key 40 could not comprise a third part 46, the first and second parts 42, 44 being directly connected to one another. Moreover, the first and second teeth 50, 54 are not the only forms conceivable for rotationally immobilizing the first part 42 of the key 40 and the body 12 of the connecting rod 10.

Whatever the embodiment, the second part 44 of the anti-rotation system 38 cooperates with the first connection system 24 and the first fastening head 14 in order to be immobilized with respect to the latter. This configuration makes it possible to obtain a more secure connection between the anti-rotation system 38 and the connecting rod 10, limiting the risks of loss of adjustment of the length of the connecting rod 10 owing to vibratory phenomena. According to another advantage, the volume and the mass of the anti-rotation system 38 are not closely tied to the diameter of the connecting rod 10, contrary to a locknut, thereby making it possible to limit the impact on the on-board mass.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connecting rod configured to connect first and second elements, the connecting rod comprising:
    a body extending between first and second ends and having a longitudinal axis, first and second fastening heads provided at each end of the body, a first connection system configured to connect the first fastening head to the first element,
    the body and the first fastening head being separate,
    the body first comprising, at the first end, an outer surface, a transverse end face and an at least partially tapped housing opening out at the transverse end face,
    the first fastening head comprising an at least partially threaded extension for screwing into the housing of the body, the connecting rod further comprising an anti-rotation system for rotationally immobilizing the first fastening head with respect to the body, wherein the anti-rotation system comprises a key, positioned astride the first fastening head and the body, the key having a first part cooperating with the body so as to be rotationally immobilized with respect to the body and a second part cooperating with the first fastening head and the first connection system so as to be immobilized with respect to the first fastening head, wherein the first connection system comprises a connection pin, wherein the first fastening head comprises at least one plate which has first and second faces parallel to each other and a through-hole housing the connection pin, wherein the second part of the key is configured to be pressed against one of the first or second faces of the plate and comprises a through-orifice configured to be aligned with the through-hole in the plate and house the connection pin, wherein the key further comprises a third part, connecting the first and second parts of the key, dimensioned in such a way that the first and second parts are simultaneously in contact with respect to the outer surface of the body and the plate of the first fastening head and in that the first fastening head comprises a transverse face substantially perpendicular to the longitudinal axis and to which the plate is attached, and in that the third part comprises a substantially plane face configured to be pressed against the transverse face of the first fastening head.

2. The connecting rod according to claim 1, wherein the first part has a face configured to be oriented towards the outer surface of the body and pressed against the outer surface, the face of the first part and the outer surface of the body having shapes which cooperate with one another so as to rotationally immobilize the first part of the key with respect to the body.

3. The connecting rod according to claim 2, wherein at least the face of the first part has a radius of curvature identical to a radius of curvature of the outer surface of the body.

4. The connecting rod according to claim 2, wherein the anti-rotation system comprises a plurality of first teeth positioned on a section of the outer surface of the body, oriented parallel to the longitudinal axis and distributed over an entire circumference of the outer surface of the body, and
wherein the face of the first part of the key has second teeth configured to nest between the first teeth of the body.

5. The connecting rod according to claim 4, wherein the first teeth extend from the transverse end face.

6. An aircraft comprising the connecting rod according to claim 1.

* * * * *